United States Patent Office 3,417,574
Patented Dec. 24, 1968

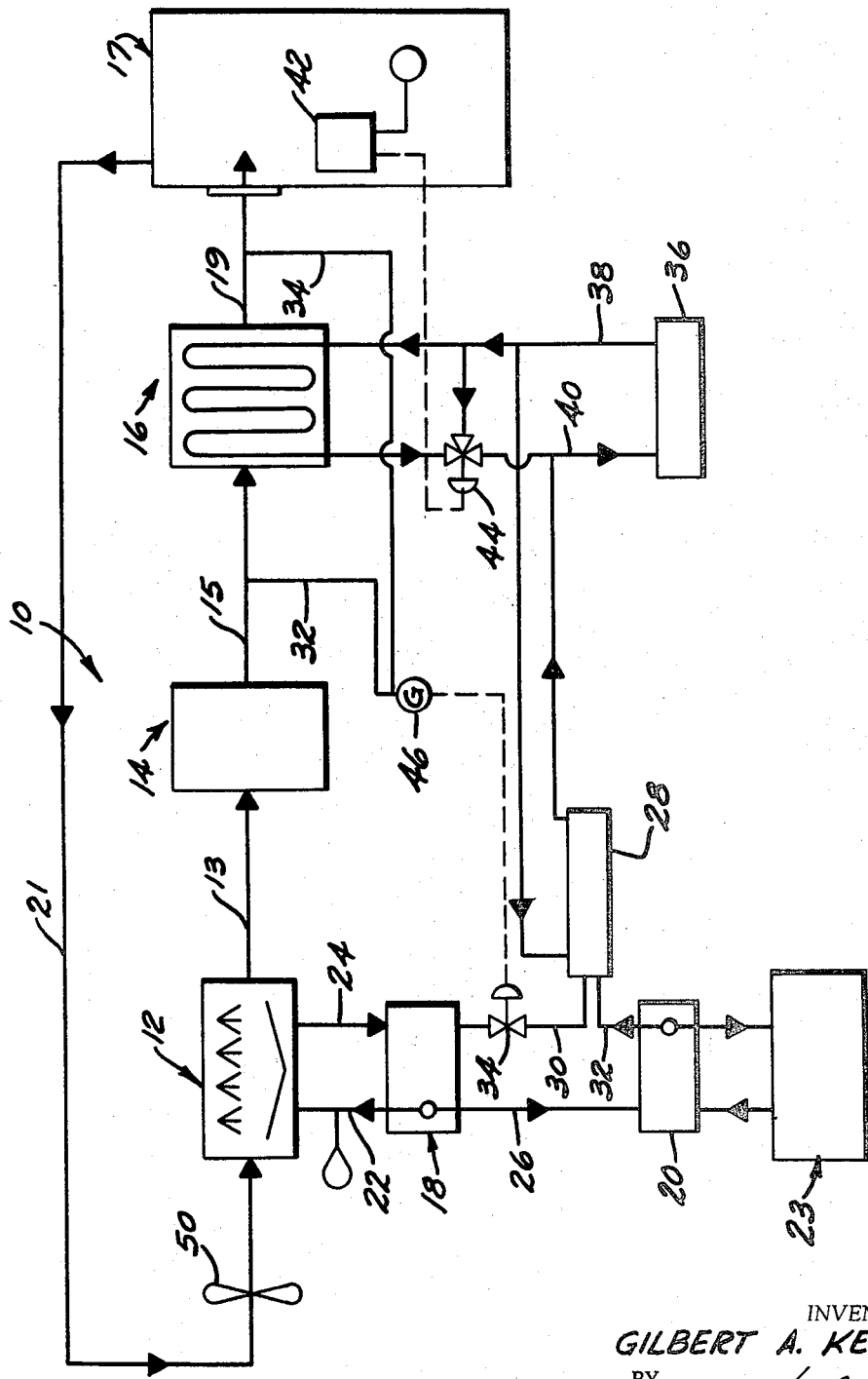

3,417,574
METHOD AND MEANS FOR PROVIDING HIGH HUMIDITY, LOW TEMPERATURE AIR TO A SPACE
Gilbert A. Kelley, Toledo, Ohio, assignor to Midland-Ross Corporation, Toledo, Ohio, a corporation of Ohio
Filed May 31, 1967, Ser. No. 642,392
9 Claims. (Cl. 62—93)

ABSTRACT OF THE DISCLOSURE

This invention relates to a method and apparatus for supplying low temperature air with high relative humidity to a refrigerated chamber. Air is removed from an outlet duct of the refrigerated chamber and passed through a spraying tower where the air is contacted with a hygroscopic solution, such as lithium chloride, to reduce the dew point of the air. The air is then passed through an eliminator where traces of hygroscopic solution picked up by the air in the tower are removed, and the air is then passed over cooling coils that reduce the temperature. Because of the decrease in dew point of the air, the temperature of the air may be reduced substantially, and the relative humidity placed at a high point without having excessive moisture condense from the air onto the cooling coils. Means is provided to control the thickness of frost upon the cooling coils at a desirable thickness to obtain optimum heat transfer from the air to the coils.

Background

It is often desirable to provide air at a temperature below freezing and with a high relative humidity to an enclosure or chamber. An example of such an enclosure is a meat packing locker wherein it is advantageous to have air at high relaitve humidities so that water is not lost from the meat being stored therein and the weight of the meat is consequently not reduced due to the loss of water. Prior methods and apparatus for supplying such high humidity, low temperature air have involved passing the air over cooling coils by continually passing a low freezing point liquid, such as triethylene glycol, over the surface of the coils. In this manner, good heat exchange is accomplished between the air and the cooling coils, but certain disadvantages are present in this system, such as the vaporization of the liquid into the air. It obviously would be advantageous to have a system wherein the air may be reduced in temperature, but retain its high relative humidity without the need of constantly splashing the surface of the coil with a liquid in order to remove the frost therefrom.

It is, therefore, an object of this invention to provide a method and means for suplying low temperature, high relative humidity air to an enclosed chamber.

It is another object of this invention to provide apparatus for supplying low temperautre, high humidity air to an enclosure wherein a cooling coil is used to cool the air and means is provided to control the thickness of frost formed on the coil.

In the single figure of the drawing, an air conditioning system is diagramatically shown, which system incorporates the principles of the instant invention.

Referring now to the drawing, an air conditioning system is shown generally at 10 and comprises a spraying tower 12, an eliminator 14, and a cooling coil unit 16. The spraying tower 12 communicates with the eliminator through a duct 13, the eliminator communicates with the cooling coil unit through another duct 15. The system conditions air and supplies it to a refrigerated chamber 17, the cooling coil unit 16 communicating with the chamber 17 through a duct 19 and the chamber, in turn, communicating with the spraying tower 12 through a duct 21 to enclose the system. A hygroscopic solution, such as lithium chloride, is supplied to the spraying tower 12 by a pair of pump units 18 and 20, the first unit 18 having a relatively low concentration hygroscopic solution and the second pump unit 20 having a relatively high concentration solution. A regenerator 23 is provided to remove moisture from the lithium chloride solution. The first pump unit 18 communicates with the tower 12 through a pair of lines 22 and 24, the flow being shown by the arrows. The high concentration pump 20 communicates with the low concentration pump 18, there being a line 26 leading from the low concentration pump to the high concentration pump. Intermediate the two pumps 18 and 20, a secondary cooling coil unit 28 is provided to remove heat from the lithium chloride solution that is dehumidified in the regenerator 23. The secondary cooling coil 28 communicates with the two pumps 18 and 20 through a pair of lines 30 and 32, respectively. In line 30, intermediate the cooling coil 28 and the pump unit 18, is a valve 34 that is used to control the flow of lithium chloride solution between the high concentration unit 20 and the low concentration unit 18.

A refrigeration unit 36 provides cooled fluid to the cooling coils units 16 and 28, which fluid may be Freon, glycol, ammonia, or any other suitable refrigerant fluid. The refrigeration unit 36 and the cooling coil unit 16 communicate with one another through a line 38 that leads from the refrigeration unit to the coil and a second line 40 leading out from the coil. The refrigerated chamber 17 has a thermometer 42 therein that measures the temperature of the chamber and the thermometer controls a valve 44 located in the refrigeration line 40, thereby controlling the quantity of refrigerant that is supplied from the refrigeraiton unit 36 to the cooling coils of the unit 16.

The eliminator intermediate the tower 12 and the cooling coils 16 is packed with a material such as glass wool that eliminates any hygroscopic solution picked up by the air as it passes through the spray in the tower.

A pressure gauge 46 measures the pressure drop across the after-cooling coil 16. More particularly, this pressure gauge 46 has a pair of lines 32 and 34 each connected to the ducts 15 and 19, respectively, measuring the difference of the pressure therein and pressure drop of of the air passing the cooling coil unit 16. This pressure drop indicates the extent of frost buildup on the cooling coils. It is recognized that there are other well known means for meausring the amount of frost buildup on the coils; however, measuring the pressure drop across the cooling coil is believed to be the most convenient and reliable method.

The duct 21 that provides communication between the packed tower 12 and the refrigerated chamber 17 has a fan 50 therein that drives the air within the system 10 as shown by the arrows.

Although the preferred embodiment includes the use of ducts to provide communication between the components of the air conditioning system illustrated, it is to be understood the use of such ducts is not necessary and that the principles of this invention apply to equipment having components free standing in the conditioned space with no duct connections.

In operation, a portion of the air is taken from the refrigerated chamber 17 by the fan 50 and is directed into the spraying tower 12. The tower 12 is a conventional dehumidification chamber that sprays a liquid desiccant, such as lithium chloride, through the air, as is well known in the art. The air in contact with the lithium chloride is dehumidified adiabatically. The lithium chloride is supplied directly to the tower 12 by the low concentration pump unit 18. The concentration of the lithium chloride within this first pump unit 18 is maintained at the proper concentration to remove the appropriate quantity of moisture from the incoming air by the valve 34 in the line 30 that leads from the high concentration pump 20, which, in turn, is in communication with the regenerator 23. Thus, as the concentration of the lithium chloride solution is reduced after dehydration of air in the tower 12, high concentration solution is added to achieve the proper level of concentration.

As the air is driven by the fan 50 through the tower 12, the eliminator 14, and the cooling coil unit 16, the pressure drop of the air as it passes over the cooling coils is measured by the pressure gauge 46. When this pressure starts to rise rapidly, indicating a buildup of frost on the cooling coil 16, a signal is transmitted to the valve 34 and the quantity of lithium chloride supplied to the tower 12 is increased so that the quantity of moisture absorbed from the air passing through the spray is increased. This increased dehumidification results in the air not only discontinuing the deposit of frost upon the coils, but causes the air to pick up moisture from the coil. This continues until the frost on the coil is reduced to the optimum thickness. It will be appreciated that the frost point will vary with the refrigerant temperature air velocity, air dry bulb temperature, and the physical characteristics of the cooling coils of the unit 16.

As we stated in a paper presented by W. F. Stoecker at the 43rd Semi-Annual Meeting of the American Society of Refrigerating Engineers in Boston on Nov. 26–28, 1965, Refrigerating Engineer 42, No. 2 (February 1957), there is a critical frost condition at which the pressure drop begins to rise rapidly. This is the preferred control point when using a pressure drop instrument for the controlling of the frost thickness. In this paper, Professor Stoecker stated that the overall coefficient of heat transfer increases after a given quantity of frost collects on an air cooling coil. Consequently, the limits set upon the pressure gauge 46 are such that a small amount of frost is maintained on the cooling coils of the unit 16 and the concentration of hygroscopic solution to the tower 12 is varied to control the accumulation of frost.

After the proper thickness of frost upon the coil is obtained, as determined by the gauge 46, then a signal is sent to the valve 34 and the flow of lithium chloride from the pump 20 is reduced so that a lower concentration of lithium chloride is circulated in the tower 12 and consequently a lower percentage of moisture will be absorbed from the air. The regenerator 23 is operated as needed to assure that the lithium chloride contained within the pump unit 20 is at a continually high concentration.

The temperature within the refrigerated chamber 17 is measured at all times by the thermometer 42 and certain limits are set so that the temperature within the chamber is kept within a preferred range. When the temperature within this chamber 17 lies outside this range, a signal is sent to the valve 44 and the flow of refrigerant from the refrigerator 36 to the cooling coil 16 is reduced or increased accordingly.

EXAMPLE

In one application of this air conditioning system, air was taken from a refrigerated chamber at the rate of 1200 c.f.m. The physical properties of the air were measured and found to have a dry bulb temperature (DB) of 30.3° F., a dew point (DP) of 30°, and 24.2 grains of moisture. The air was passed through the spraying tower 12 having a shower of lithium chloride with a concentration of 23.49%. The air was then passed through an eliminator unit 14 having plastic mesh therein to extract the traces of lithium chloride picked up by the air and the properties were measured once more. The air on the downstream side of the eliminator was found to have 35.9° DB, 63% RH, 25.2° DP and 19.4 grains of moisture. Then air was passed through the coils of a cooling unit 16 with an entering refrigerant temperature of 20.5° F. and had the following properties thereafter: 26.2° DB, 24° DP, 89% RH and 18.2 grains of moisture. This air was then passed into the refrigerated chamber 17 and the procedure was continued.

Thus, it can be seen that the temperature of the air was reduced approximately 4°, the grains of moisture reduced 6°, and outlet dew-point temperature was 3.5° above the inlet refrigerant temperature. Thus, an air conditioning system is provided wherein it is possible to continually maintain low temperature air having high relative humidity. It will be observed that in this particular example the grains of moisture were reduced as the air passed over the cooling coils. Obviously, this would indicate an increase in frost thickness on the cooling coils. To reduce the frost thickness on the coils, the concentration of the pump unit may be increased to reduce the grains of moisture passing over the cooling coil and it has been found that this further conditioned air will absorb moisture from the coils and reduce the thickness of the frost thereon.

Although only a single embodiment of this invention has been shown and described, it is understood that changes and modifications can be made therein, and this description is illustrative only and not for the purpose of rendering this invention limited to the details illustrated or described except insofar as they are limited by the terms of the following claims.

I claim:

1. In an air conditioning apparatus for providing low temperature, high humidity air to an enclosed chamber, the combination comprising: first compartment means, means for diverting a portion of air from the enclosed chamber through said first compartment means, dehumidification means disposed within said compartment means for reducing the dew point of air, second compartment means in communication with said first compartment having means for eliminating hygroscopic solution from the air, cooling coil means in communication with said second compartment, said cooling coil means being in communication with the enclosed chamber, means for measuring frost thickness on said cooling coil means, and means for controlling said dehumidification means in response to said measuring means.

2. The apparatus of claim 1 wherein said dehumidification means compirses a spray of hygroscopic solution through which the air passes.

3. The apparatus of claim 2 wherein said hygroscopic solution is lithium chloride.

4. In an air conditioning apparatus for providing low temperature, high humidity air to an enclosed chamber, the combination comprising: first wall means defining a first housing, means for supplying a shower of hygroscopic solution within said housing, means for diverting a portion of air from the enclosed chamber and passing it through said shower of said first wall means, means for directing the air through an eliminator to recover hygroscopic solution carried away by the air, means for directing the air through a second wall means defining a housing and having a cooling coil therein, means for directing the air from the cooling coil into the enclosed chamber, means for sensing the pressure drop across the cooling coil, means responsive to said pressure drop for varying the concentration of said hygroscopic solution, means for sensing the temperature within the enclosed chamber and means responsive to said sensing means for controlling the temperature of said cooling coil.

5. In an air conditioning apparatus for providing low temperature, high humidity air to an enclosed chamber having a pair of openings therein, the combination comprising: wall means defining a first housing having a pair of spaced openings therein, a shower of hygroscopic solution located in the upper portion of said housing, wall means defining a second housing having first and second spaced openings, a first duct extending from an opening of said first housing to an opening in said second housing, a cooling coil disposed within said second housing, said second housing being in communication with the enclosed chamber through a duct extending from the other of said second housing openings to an opening in the chamber, a second duct extending from the other opening of the chamber to the other opening of said first housing, means for sensing the temperature within the chamber, means responsive to said sensing means for varying the temperature of said coil, means for measuring the air pressure drop across said coil, means for controlling the concentration of hygroscopic solution in said shower in said first housing, said concentration means being responsive to said pressure drop measuring means.

6. In an air conditioning apparatus for providing low tempearture, high huimidity air to an enclosed chamber, the combination cmoprising: wall means defining a spraying tower having a pair of spaced openings therein, showers located in the upper portion of said tower and over said openings, a first pumping unit for supplying hygroscopic solution to said showers, a second pumping unit for supplying hygroscopic solution to said first unit, a regenerator in communication with said second pumping unit to remove moisture from the hygroscopic solution therein, a first cooling unit in communication with one of said pumping units to cool hygroscopic solution of said one unit, a second cooling unit having first and second spaced openings therein, a duct leading from one opening of said spraying tower to the first opening of said second cooling unit, a cooling coil disposed within said second cooling unit intermediate said spaced openings, means for supplying refrigerant fluid to said coil, means for sensing the temperature within the enclosed chamber, means for controlling the flow of refrigerant to said coil responsive to said temperature sensing means, means for meausring the pressure drop across the coil, said pressure drop means controlling the concentration of hygroscopic solution in said tower, and means for diverting air from the enclosed chamber through said other housing opening and directing it through said spray tower by said cooling coil, through said second cooling unit opening and back into the enclosed chamber.

7. The apparatus of claim 6 including eliminator means intermediate said packing tower and said second cooling coil for eliminating hygroscopic solution from the air.

8. In a method of providing low temperature, high humidity air to an enclosed chamber, the combination comprising: diverting air from the enclosed chamber and passing it through a hygroscopic solution to reduce the dew point of the air, passing the air over a cooling coil, measuring the air pressure drop across the cooling oil, increasing the concentration of hygroscopic solution when the pressure drop is great, measuring the temperature within the chamber and controlling the temperature therein by varying refrigerant to the cooling coils, and directing the air back into the enclosed chamber.

9. In a method of providing low temperature, high huimidity air to an enclosed chamber, the combination comprising: diverting air from the enclosed chamber and passing it through a hygroscopic solution to reduce the dew point of the air, passing the air over a cooling coil, meausring the frost thickness of the cooling coil, varying the concentration of hygroscopic solution to maintain a predetermined thickness of frost on the cooling coil, measuring the temperature within the chamber and controlling the temperature therein by varying the quantity of refrigerant to the cooling coils, and directing the air back into the enclosed chamber.

References Cited

UNITED STATES PATENTS

| | | | |
|---|---|---|---|
| 2,324,193 | 7/1943 | Brunel | 62—271 |
| 2,355,828 | 8/1944 | Taylor | 62—271 |
| 2,556,250 | 6/1951 | Bauman | 62—271 |
| 3,004,399 | 10/1961 | Keller | 62—151 |

WILLIAM J. WYE, *Primary Examiner.*

U.S. Cl. X.R.

62—128, 140, 176, 150, 94, 271